Jan. 18, 1938.   J. N. BLAIR   2,105,963
PROPELLER
Filed Jan. 11, 1937
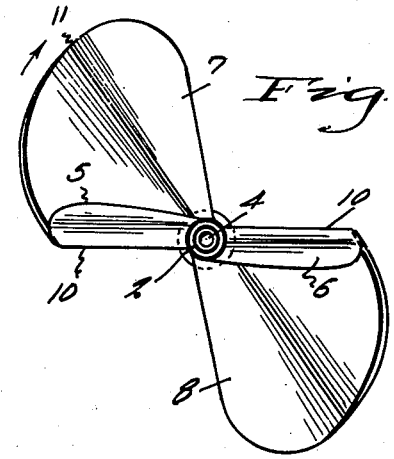
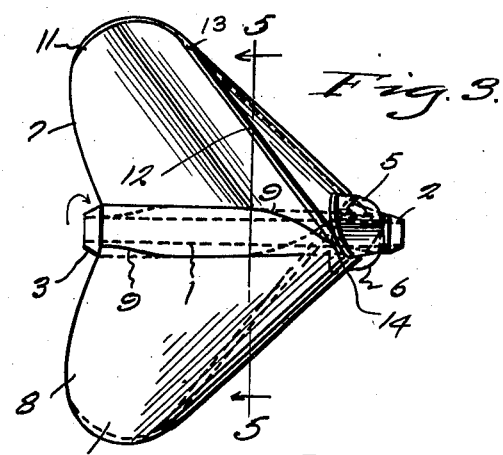
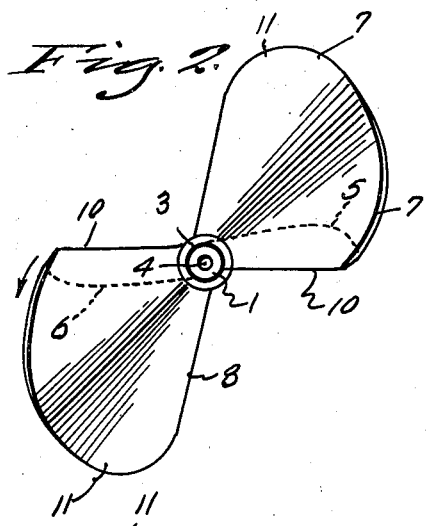
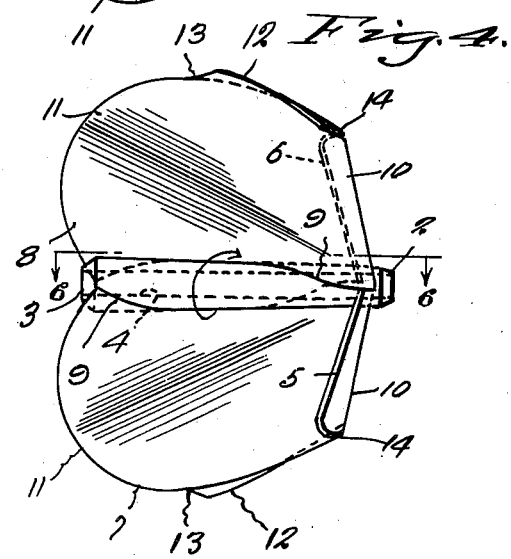
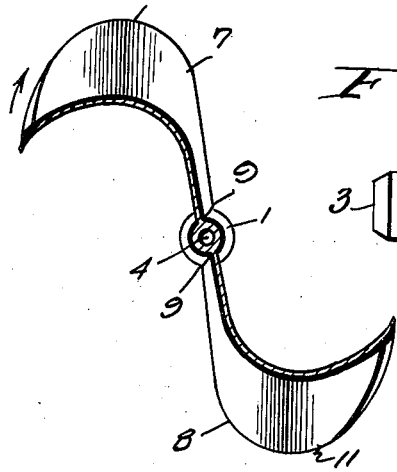
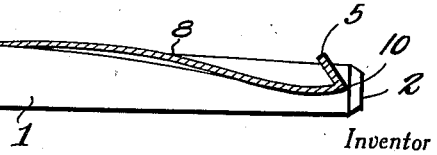
Inventor
Joseph N. Blair
By Clarence A. O'Brien
Hyman Berman
Attorneys Patented Jan. 18, 1938

2,105,963

UNITED STATES PATENT OFFICE 2,105,963

PROPELLER

Joseph N. Blair, Detroit, Mich., assignor of one-half to John W. Roxborough, Detroit, Mich.

Application January 11, 1937, Serial No. 120,069

1 Claim. (Cl. 170—159)

This invention relates to improvements in propellers, particularly marine propellers, and the object of the invention is to provide a non-slip fan type propeller of a novel design and construction having the maximum propelling efficiency.

With the above in view, the invention provides, in a propeller, cutting blades which act as slicers to separate the water or other surrounding mediums which is harnessed and forced back by forcing blades in conical form without slippage.

Other objects and advantages of the invention may be apparent from the following detail description of the propeller considered in connection with the accompanying drawing, wherein:

Figure 1 is a front elevation of a propeller.
Figure 2 is a rear elevation.
Figure 3 is a side elevation.
Figure 4 is a plan view.
Figure 5 is a horizontal section on line 5—5 of Fig. 3.
Figure 6 is a view in longitudinal section taken on the line 6—6 of Figure 4 looking in the direction indicated by the arrows.

The hub of the propeller consists of a forwardly tapering tubular shaft 1 having bevelled jacket 2 and 3 at the fore and aft ends respectively of the bore form and revolved in the direction indicated by the arrows in the various figures of the drawing. At the forward end of the shaft but inwardly of the jacket 2 are oppositely and laterally projecting cutting blades 5 and 6 which taper toward their inner or root sections. The cutting blades have a backward slope placing the blade tips rearwardly of the root sections, as clearly shown in Figs. 3 and 4.

Fixed to the propeller shaft 1 along the left thereof and behind the cutting blades 5 and 6 are a pair of forcing blades 7 and 8. These forcing blades have their inner or root edges spirally disposed about the shaft, as indicated at 9, with the blade 7 oppositely disposed with respect to blade 8, and both blades are integrally united at their forward edges to corresponding cutting blades for the full length of one edge of the cutting blade, as indicated at 10. In the particular embodiment shown, the forcing blade 7 is integral with the cutting blade 5 and the forcing blade 8 is integral with the diagonally opposite edge of the cutting blade 6, as illustrated in Figs. 1 and 2. These forcing blades are fan-shaped units which, as viewed in front and rear elevation, are of considerable blade area trailing the leading edges of their cutting blades and with oppositely curved outer portions 11 as seen in Fig. 5.

On the outer forward edge of each of the forcing blades 7 and 8 is a fin 11 extending from a point 13 approximately the length of the blade to a point 14 at the tip of the corresponding cutting blade adjacent the leading edge of the latter. These fins extend gradually inwardly and laterally of the forward faces of their respective fan or forcing blade and they provide flanges extending rearwardly and outwardly from the tips of the cutting blades 5 and 6, as shown in Figs. 3 and 4.

In operation, as the propeller is rotated, the blades 5 and 6 act as slicers to separate the surrounding water or other medium which is harnessed or trapped by the fins 11 and forced back by the forcing blades 7 and 8 in conical form without slippage.

With the above described arrangement of propeller blades and area of effective blade surface presented thereby a propelling force is obtainable which, in comparison with conventional screw propellers, will provide for an increase in speed of marine vessels.

What is claimed is:—

A propeller comprising a tubular shaft, a pair of diametrically opposed propeller blades extending therefrom, said blades comprising substantially straight front ends and side edges curving rearwardly from said ends, the front ends terminating in a pair of diametrically opposed laterally projecting cutting blades extending along the same upon opposite sides thereof, respectively, and inclining laterally and rearwardly, and said side edges of the propeller blades having formed thereon a pair of laterally and oppositely extending trailing fins extending from said cutter blades in angular relation thereto.

JOSEPH N. BLAIR.